United States Patent [19]

Adler et al.

[11] 4,043,962

[45] Aug. 23, 1977

[54] PARTICULATED RUBBER AND PLASTICS COVERINGS AND BINDERS THEREFOR

[75] Inventors: Klaus Adler; Engelbert Pichler; Christoph Kemenater; Wilfried Dressler; Johann Bauer, all of Burghausen, Germany

[73] Assignee: Wacker-Chemie GmbH, Munich, Germany

[21] Appl. No.: 618,447

[22] Filed: Oct. 1, 1975

[30] Foreign Application Priority Data

Oct. 14, 1974 Germany .............................. 2448852

[51] Int. Cl.² ...................... C08L 61/10; C08L 61/24; C10M 3/04
[52] U.S. Cl. ........................................ 260/29.3; 260/3; 260/4 R; 260/6; 260/7; 260/14; 260/15; 260/17.2; 260/17.3; 260/29.4 R; 260/29.4 UA; 260/38; 260/39 R; 260/39 M; 260/843; 260/844; 260/850; 260/851; 428/403; 428/407

[58] Field of Search ................. 260/29.4 UA, 29.4 R, 260/29.3, 844, 851, 850, 843, 38, 39, 3, 4 R; 428/403

[56] References Cited

U.S. PATENT DOCUMENTS

| 3,703,492 | 11/1972 | Masuda | 260/851 X |
| 3,944,100 | 3/1976 | Brockway | 260/851 X |

*Primary Examiner*—Theodore E. Pertilla
*Attorney, Agent, or Firm*—Hammond & Littell

[57] ABSTRACT

A readily dryable adhesive binder for particulated rubber and/or plastics compositions comprising from 1% to 10% by weight of a water-soluble formaldehyde polycondensation resin, from 0.5% to 5% by weight of formaldehyde or a compound liberating formaldehyde, and from 85% to 98.5% by weight of a film-forming plastics dispersion; as well as a composition forming a resilient covering comprising from 40% to 75% by weight of particulated rubber and/or plastics and from 25% to 60% by weight of the above adhesive binder.

16 Claims, No Drawings

PARTICULATED RUBBER AND PLASTICS COVERINGS AND BINDERS THEREFOR

THE PRIOR ART

The formation of resilient coverings from particulated rubber and/or plastic material are well known. Coverings of this type are used for a wide variety of purposes, and particularly as ground coverings. They may, for example, be used as ground coverings for sports grounds, such as handball courts, tennis courts and running tracks, for children's playgrounds, and for footpaths in such places as, for example, shopping centers and pedestrian precincts. They may also be used as sound-absorbing layers on the inner or outer walls of buildings and the like on ceilings.

There are two basic ways of producing coverings of this type. One is to manufacture them in the form of plates, webs, or the like, and subsequently to glue them to a suitable base, for example, concrete or bitumen surfaces, with a suitable adhesive, for example, a polyurethane rubber composition or a plastics or rubber dispersion. The second method is to manufacture them in situ from a spreadable composition, in which case the binder in the pastelike composition also serves to glue the covering to the base on which it is formed.

The manufacture of these resilient coverings in the form of plates, webs, and the like has various disadvantages. One such disadvantage is that it can be difficult to glue these plates, webs, and the like to rough bases without using an intermediate leveling layer, with the result that there are areas that are incompletely glued. Water can penetrate into such areas, and result in the formation of vapor bubbles beneath the covering. Moreover, there is a tendency for the edges of the plates, webs, and the like to bend up. This may be caused by a variety of factors, for example, by thermal expansion, or by alternate dry-shrinking and wet-swelling.

Various binders have been used in spreadable compositions produced for the manufacture of coverings in situ. One such binder is a polyurethane ruber binder, but this has the disadvantage that compositions incorporating it will set only on a dry base and, therefore, cannot be laid outside in wet weather. It is also necessary to use a special apparatus for laying these compositions.

Binders based on plastics dispersions have also been used. Because of their relatively high water content (about 40% to 60%), compositions incorporating these binders can be applied only in relatively thin layers of 2 to 4 mm thickness. If they are applied in thicker layers of up to 5 cm, as frequently desired in practice, they dry out very badly because the surface dries first with the formation of a film that hinders the passage of moisture and the drying of the lower parts of the layer. This means that the formation of a covering of about 1 to 3 cm thickness requires several steps. Moreover, the coverings tend to shrink during setting and drying because of the removal of the water, and this results in the covering having a low dimensional stability and in the formation of cracks and the like therein.

Another class of binders that has been used consists of binders based on polycondensate resins of formaldehyde with one or more of phenol, urea and malamine, with the optional additional inclusion of formaldehyde additives and of catalysts. They may be applied at ambient temperature or at higher temperatures. There can sometimes, however, be insufficient adhesion between these binders and the rubber or plastics particles, as well as a difference in the resilient properties. The influence of environmental factors, such as solar irradiation, temperature change and dampness, can also adversely affect the coverings. For example, they may become embrittled in the cold, and urea resins in particular may become hydrolyzed. The combined effect of all these factors can be an earlier disintegration of the covering.

OBJECTS OF THE INVENTION

An object of the present invention is to develop a binder for particulated rubber and/or plastic material which dries readily in layers up to 5 cm thick and gives an adhesive bonding not subjected to climatic disintegration on outdoor exposure.

Another object of the present invention is the development of a readily dryable adhesive binder for particulated rubber and/or plastic material consisting essentially of an aqueous mixture of from 1% to 10% by weight of a still water-soluble formaldehyde polycondensate resin, from 0.5% to 5% by weight of formaldehyde as obtained from a compound selected from the group consisting of formaldehyde and formaldehyde condensates releasing formaldehyde on hydrolysis and from 85% to 98.5% by weight of a film-forming plastics dispersion.

A further object of the present invention is the development of a composition forming a resilient coating on drying consisting essentially of from 40% to 75% by weight of a particulate resilient material selected from the group consisting of rubber, plastics and mixtures thereof and from 25% to 60% by weight of a binder consisting essentially of an aqueous mixture of from 1% to 10% by weight of a still water-soluble formaldehyde polycondensate resin, from 0.5% to 5% by weight of formaldehyde as obtained from a compound selected from the group consisting of formaldehyde and formaldehyde condensates releasing formaldehyde on hydrolysis, and from 85% to 98.5% by weight of a film-forming plastics dispersion.

These and other objects of the invention will become more apparent as the description thereof proceeds.

DESCRIPTION OF THE INVENTION

The present invention provides a binder comprising from 1% to 10% by weight of a water-soluble formaldehyde polycondensation resin, from 0.5 to 5% by weight of formaldehyde, and from 85 to 98.5% by weight of a plastics dispersion, all percentages being based on the total weight of these three components. More particularly, the present invention relates to a readily dryable adhesive binder for particulated rubber and/or plastic material consisting essentially of an aqueous mixture of from 1% to 10% by weight of a still water-soluble formaldehyde polycondensate resin, from 0.5% to 5% by weight of formaldehyde as obtained from a compound selected from the group consisting of formaldehyde and formaldehyde condensates releasing formaldehyde on hydrolysis, and from 85% to 98.5% by weight of a film-forming plastics dispersion.

The adhesive binder of the invention is employed in a composition of the binder and rubber particles and/or plastic particles to form resilient coverings, either in the form of sheet-like structures, such as plates, webs and the like, or for application to surfaces by spreading thereon in thickness exceeding 1 cm, preferably a thickness of from 1.5 to 3 cm.

These compositions preferably comprise a composition forming a resilient coating on drying consisting essentially of from 40% to 75% by weight of a particulate resilient material selected from the group consisting of rubber, plastics and mixtures thereof and from 25% to 60% by weight of a binder consisting essentially of an aqueous mixture of from 1% to 10% by weight of a still water-soluble formaldehyde polycondensate resin, from 0.5% to 5% by weight of formaldehyde as obtained from a compound selected from the group consisting of formaldehyde and formaldehyde condensates releasing formaldehyde on hydrolysis, and from 85% to 98.5% by weight of a film-forming plastics dispersion. Since the components can be mixed individually, in a broader sense the invention involves a composition forming a resilient coating on drying consisting essentially of (I) from 50% to 100% by weight of a mixture of from 20% to 50% by weight of said mixture of a film-forming plastics dispersion with a solids content of from 30% to 65% by weight of the dispersion, from 40% to 75% by weight of said mixture of a particulate resilient material selected from the group consisting of rubber, plastics and mixtures thereof, from 0.5% to 10% by weight of said mixture of a still water-soluble formaldehyde polycondensate resin, and from 0.1 to 5% by weight of said mixture of formaldehyde as obtained from a compound selected from the group consisting of formaldehyde and formaldehyde condensates releasing formaldehyde on hydrolysis, and from 0 to 2% by weight of said mixture of an acid setting catalyst, and (II) from 0 to 50% by weight of inert fillers.

Preferably, in said mixture, (a) said film-forming plastics dispersion has a solids content of from 40% to 55% by weight and is present in an amount of from 25% to 35% by weight of said mixture, (b) said still water-soluble formaldehyde condensate resin is a condensate of formaldehyde with a phenol, melamine and/or urea and is present in an amount of from 1% to 3% by weight of said mixture and is mixed either in solid form or in the form of an aqueous solution, (c) said formaldehyde is present in an amount of from 0.5% to 1.5% by weight of said mixture, and (d) said acid setting catalyst is present in an amount of from 0.1% to 2% by weight of said mixture and is mixed either in solid form or in the form of an aqueous solution.

These compositions can be spread quite easily and the surface of the composition as spread can readily be smoothed. The compositions, when spread in the form of a covering, will dry relatively quickly even in fairly thick layers, and lose any tackiness after a fairly short time. Because of the relatively rapid drying of these compositions, the risk of the plastics dispersion being washed out of a covering laid outside, as a result of it raining during the drying period, is considerably lessened. Moreover, because of the relatively quick drying, the coverings can be walked upon only a relatively short time after being laid. The resilient coverings are durable against environmental factors and wear, and have a good dimensional stability. There is little shrinkage or crack-formation on drying.

Suitable still water soluble formaldehyde polycondensation resins are, for example, urea-formaldehyde resins, phenol-formaldehyde resins, and melamine-formaldehyde resins. These may suitably be produced by the polycondensation of urea, melamine, phenol or derivatives thereof with formaldehyde in a conventional manner. The polycondensation conditions, such as pressure, temperature, and catalyst, as well as formaldehyde addition, are so chosen that a product consisting mainly of chain condensates with only a small proportion of surface and volume cross-linking is obtained, whereby the same is still water-soluble. The resin may be mixed with the other components either as a solid or in aqueous solution. In the composition, the resin is preferably used in an amount of from 1 to 3% by weight, based on the total weight of the components of the mixture.

Formaldehyde is used in the binder and composition as a setting component. It is preferably used in the form of an aqueous solution, for example, as formalin. Formaldehyde can alternatively be used in the form of a formaldehyde polycondensates that will release formaldehyde on hydrolysis. Suitable polycondensates are, for example, paraformaldehyde, hexamethylene-triamine, methylol urea and mixtures thereof. In the composition, the formaldehyde is preferably used in an amount of from 0.5 to 1.5% by weight, based on the total weight of the mixture.

The film-forming dispersion is advantageously an aqueous dispersion. It may have a solids content of from 30% to 65% by weight, preferably from 40% to 55% by weight, based on the total weight of the dispersion.

Many different plastics materials may be used as the solid of the plastics dispersion. Some examples of suitable plastics materials are vinyl and vinylidene polymers and copolymers, for example, polyvinyl acetate, polyvinyl chloride and polyvinylidene chloride, and copolymers thereof with propylene, butylene, acrylonitrile and, preferably, ethylene; dibutylmaleate, ethylacrylate, etc.; styrene copolymers, for example, styrene-butadiene copolymer; rubber latices, for example, after-chlorinated rubber, polychloroprene, chlorosulfonated polyethylene; chlorinated polyethers; alkyd resins comprising, for example, polybasic acids and anhydrides for example, phthalic anhydride and maleic anhydride condensed with polyhydric alcohols, for example, glycerol and pentaerythritol, and monobasic fatty acids; polyacrylates, for example, polymethyacrylic acid, polymethyl methacrylate, and polyethylhexylacrylate, and copolymers thereof with acrylonitrile and butadiene; and mixtures of such polymers.

It is advantageous to use a plastics material having a glass transition temperature of below 30° C and a film formation temperature within the range of from 0° to 30° C. The preferred plastics dispersion is a dispersion of an ethylene/vinyl acetate copolymer, advantageously having an ethylene content of from 10% to 60%, preferably from 15% to 30%, by weight of the polymer.

The plastics dispersion may contain a protective colloid as is known in the art, such as carboxymethyl cellulose, water-soluble starch, fish glue, or, preferably, polyvinyl alcohol.

The amount of plastics dispersion in the composition according to the invention is preferably from 25% to 35% by weight, based on the total weight of components in the mixture.

The particulated resilient material present in the compositions of the invention in said mixture are preferably particles of from 0.5 mm to 15 mm in cross-section and are obtained from rubber, plastics or mixtures thereof.

The rubber particles may be of either natural or synthetic rubber. Suitable synthetic rubbers are, for example, polyisoprene, polychloroprene, polyacrylonitrile, polybutadiene, ethylene/propylene copolymers, butadiene/styrene copolymers, acrylonitrile/butadiene copolymers, acrylonitrile/methyl methacrylate copolymers, and, preferably, ethylene/vinyl acetate copolymers. Milled rubber scrap from a wide variety of sources can be used, for example, rubber powder or granules from the comminution of old tires. Mixtures of different types of rubber can be used.

A wide variety of plastics materials can be used for the plastics particles. Examples of suitable materials are polyvinyl esters, polyolefins, polyvinyl halides, polyesters, polyamides, polycarbonates, polyacrylates, polystyrene and plasticized polyvinyl chloride. Various organic and inorganic fillers and other auxiliaries, for example, inorganic and/or organic pigments and dyestuffs, may have previously been incorporated in the plastics material. Examples of such fillers and auxiliaries are sawdust, cork powder, siliceous chalk, heavy spar, talc, mica, asbestos, pyrophyllite, calcite, gypsum, dolomite, titanium dioxide, iron oxides, chromium oxides, and phthalocyanin blue.

In order to alter the setting time of the composition, a setting catalyst may be included in the mixture. The catalyst is suitably used in an amount of from 0.1% to 2%, preferably from 0.5% to 1%, by weight, based on the total weight of the mixture. Acid catalysts are suitably used. The catalyst may be, for example, a dilute mineral acid, such as hydrochloric acid, an organic acid, such as oxalic acid, or an acid-hydrolyzing salt, such as chromium (III) nitrate, aluminum chloride or zinc nitrate.

The compositions may additionally contain various additives and auxiliaries. These include such substances as, for example, fillers, non-slip additives, etc., such as quartz or glass powder, silicon carbide, boron carbide, and/or reflective materials. These latter are, for example, aluminum bronze, glass or plastics beads, and mixtures thereof. These additive and auxiliaries are customarily called fillers and may suitably be incorporated in amounts of from 1% to 100% by weight relative to the total weight of the components of the mixture.

The various components of the composition according to the invention can be mixed together manually or in simple mixers, such as those used on building sites.

The following examples are illustrative of the practice of the invention without being limitative.

EXAMPLES

Examples 1 to 8 illustrate various compositions according to the invention, and the comparison example illustrates a composition not according to the invention.

The setting time given in the examples is the time taken for a 2.5 cm thick layer of the respective composition to be set sufficiently firmly that it can be walked upon. The parts and percentages given in the examples are by weight.

EXAMPLE 1

31.6% of plastics dispersion (vinyl acetate/ethylene copolymer having an ethylene content of 17% in the copolymerizate and a 50% by weight solids content in the dispersion),
66.4% of granulate (consisting of 100 parts of vinyl acetate/ethylene copolymer having an ethylene content of 40%, 90 parts of siliceous chalk, 3 parts of iron oxide, and 1 part of calcium stearate),
1.6% of a still water-soluble melamine-formaldehyde resin, and
0.4% by weight of formaldehyde in the form of a 30% aqueous solution.
Setting time: 24 hours.

EXAMPLE 2

31.2% of a plastics dispersion as in Example 1,
66.0% of granulate as in Example 1,
1.6% of a still water-soluble melamine-formaldehyde resin as in Example 1,
0.4% of formaldehyde in the form of a 30% aqueous solution, and
0.8% of chromium (III) nitrate in the form of a 40% aqueous solution.
Setting time: 3 to 4 hours.

This example demonstrates the effect of the added acid setting catalyst.

EXAMPLE 3

45.4% of pulverulent vinyl acetate/ethylene copolymer with an ethylene content of 35% (less than 1.5 mm diameter),
6.8% quartz powder,
31.8% of plastics dispersion (as in Example 1),
13.6% of water,
1.4% of a still water-soluble melamine-formaldehyde resin,
0.4% of formaldehyde in the form of a 30% aqueous solution, and
0.6% of oxalic acid in the form of a concentrated aqueous solution.
Setting time: 6 to 8 hours.

EXAMPLE 4

27.4% of plastics dispersion (vinyl acetate/ethylene copolymer with an ethylene content of 20% and 50% solids by weight in the dispersion),
31.0% of pulverulent vinyl acetate/ethylene copolymer with 60% ethylene content (particle diameter less than 0.1 mm),
40.0% of granulate comprising ground car tires with a particle diameter of less than 3 mm,
1.0% of a still water-soluble phenol-formaldehyde resin, and
0.6% of formaldehyde in the form of a 30% aqueous solution.
Setting time: 8 to 10 hours.

EXAMPLE 5

27.2% of plastics dispersion (vinyl acetate/ethylene copolymer with an ethylene content of 20% and a solids content of 55% by weight in the dispersion),
30.8% of pulverulent vinyl acetate/ethylene copolymer with an ethylene content of 55% and an average particle size of 0.1 mm,
40.0% of granulate as in Example 4,
1.0% of a still water-soluble phenol-formaldehyde resin,
0.6% of formaldehyde in the form of a 30% aqueous solution, and
0.4% of aluminum chloride in the form of a 27% aqueous solution.
Setting time: 3 to 4 hours.

EXAMPLE 6

24.0% of a plastics dispersion comprising polychloroprene latex, with a solids content of 60% by weight of the dispersion,
73.0% of granulate as in Example 1,
1.9% of a still water-soluble phenol-formaldehyde resin,
0.5% of formaldehyde in the form of a 30% aqueous solution, and 0.6% of aluminum sulfate in the form of a concentrated aqueous solution.

Setting time: 2 to 3 hours.

EXAMPLE 7

30.5% of a 50% by weight poly-2-chlorobutadiene dispersion, 62.0% of scrap rubber granulate with a particle diameter of between 2 and 10 mm, 6.0% of vinyl acetate/ethylene copolymer with an ethylene content of 40% (particle diameter less than 0.1 mm), 1.0% of a still water-soluble phenol-formaldehyde resin, and 0.5% of formaldehyde in the form of a 30% aqueous solution.

Setting time: 6 to 8 hours.

EXAMPLE 8

28.0% of a plastics dispersion comprising a butadiene/acrylonitrile mixed polymerizate dispersion with an acrylonitrile content of 28%, 52.0% of scrap rubber granulate with a particle diameter of less than 5 mm, 17.0% of foamed polystryene granulates, 1.6% of a still water-soluble melamine-formaldehyde resin, 0.8% of formaldehyde in the form of a 30% aqueous solution, and 0.6% of aluminum nitrate in the form of a concentrated aqueous solution.

Setting time: 6 to 9 hours.

COMPARISON EXAMPLE 32.6% of plastics dispersion as in Example 1, and
67.4% of granulate as in Example 1.

A 2.5 cm thick layer could not be walked on even after 14 days since the covering had formed only a film on the surface. When it was stepped onto, the dispersion was pressed out from underneath.

The preceding specific embodiments are illustrative of the practice of the invention. It is to be understood, however, that other expedients known to those skilled in the art or disclosed herein, may be employed, without departing from the sirit of the invention or the scope of the appended claims.

We claim:

1. A readily dryable adhesive binder for particulated resilient material selected from the group consisting of rubber, plastics and mixtures thereof consisting essentially of an aqueous mixture of from 1% to 10% by weight of a still water-soluble formaldehyde polycondensate resin selected from the group consisting of a urea-formaldehyde resin, a phenolformaldehyde resin and a melamine-formaldehyde resin, from 0.5to 5% by weight of formaldehyde as obtained from a compound selected from the group consisting of formaldehyde and formaldehyde condensates releasing formaldehyde on hydrolysis, and from 85% to 98.5% by weight of a film-forming plastics dispersion.

2. The adhesive binder of claim 1 wherein said film-forming plastics dispersion contains a dispersed plastic having a glass transition temperature of below 30° C and a film formation temperature within the range of from 0° to 30° C.

3. The adhesive binder of claim 2 wherein said dispersed plastic is a vinyl acetate/ethylene copolymer.

4. The adhesive binder of claim 3 wherein said vinyl acetate/ethylene copolymer has an ethylene content of from 10% to 60% in the copolymer.

5. The adhesive binder of claim 4 wherein said ethylene content is from 15% to 30% of said copolymerizate.

6. The adhesive binder of claim 1 wherein said film-forming plastics dispersion has a solids content of from 30% to 65% by weight.

7. The adhesive binder of claim 6 wherein said solids content is from 40% to 55%.

8. A composition forming a resilient coating on drying consisting essentially of from 40% to 75% by weight of a particulated resilient material selected from the group consisting of rubber, plastics and mixtures thereof and from 25% to 60% by weight of a binder consisting essentially of an aqueous mixture of from 1% to 10% by weight of a still water-soluble formaldehyde polycondensate resin selected from the group consisting of a urea-formaldehyde resin, a phenol-formaldehyde resin and a melamine-formaldehyde resin, from 0.5% to 5% by weight of formaldehyde as obtained from a compound selected from the group consisting of formaldehyde and formaldehyde condensates releasing formaldehyde on hydrolysis, and from 85% to 98.5% by weight of a film-forming plastics dispersion.

9. The composition of claim 8 wherein said film-forming plastics dispersion contains a dispersed plastic having a glass transition temperature of below 30° C and a film formation temperature within the range of 0° to 30° C.

10. A composition forming a resilient coating on drying consisting essentially (I) from 50% to 100% by weight of a mixture of from 20% to 50% by weight of said mixture of a film-forming plastics dispersion with a solids content of from 30% to 65% by weight of the dispersion, from 40% to 75% by weight of said mixture of a particulated resilient material selected from the group consisting of rubber, plastics and mixtures thereof, from 0.5 to 10% by weight of said mixture of a still water-soluble formaldehyde polycondensate resin selected from the group consisting of a urea-formaldehyde resin, a phenol-formaldehyde resin and a melamine-formaldehyde resin, from 0.1% to 5% by weight of said mixture of formaldehyde as obtained from a compound selected from the group consisting of formaldehyde and formaldehyde condensates releasing formaldehyde on hydrolysis, and from 0 to 2% by weight of said mixture of an acid setting catalyst, and (II) from 0 to 50% by weight of inert fillers.

11. The composition of claim 10 wherein said film-forming plastics dispersion contains a dispersed plastic having a glass transition temperature of below 30° C and a film formation temperature within the range of from 0° to 30° C.

12. The composition of claim 11 wherein said dispersed plastic is a vinyl acetate/ethylene copolymer.

13. The composition of claim 12 wherein said vinyl acetate/ethylene copolymer has an ethylene content of from 10% to 60%.

14. The composition of claim 10 wherein said solid content of said dispersion is from 40% to 55%.

15. The composition of claim 10 wherein said mixture is present in said composition in an amount of 100%.

16. The compositions of claim 10 wherein in said mixture, said plastics dispersion is present in an amount of from 25% to 35% by weight and has a solids content of from 40% to 55% by weight, said still water-soluble formaldehyde condensate resin is present in an amount of from 1% to 3% by weight, said formaldehyde is present in an amount of from 0.5% to 1.5% by weight, and said acid setting catalyst is present in an amount of from 0.1% to 2% by weight.

* * * * *